(12) United States Patent
Ko et al.

(10) Patent No.: US 6,622,057 B1
(45) Date of Patent: Sep. 16, 2003

(54) SEMICONDUCTOR FACTORY AUTOMATION SYSTEM AND METHOD FOR CONTROLLING AUTOMATIC GUIDE VEHICLE

(75) Inventors: Myung-Jai Ko, Ichon-shi (KR); Young-Soo Cho, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 597 days.

(21) Appl. No.: 09/597,482

(22) Filed: Jun. 19, 2000

(30) Foreign Application Priority Data

Jun. 22, 1999 (KR) ........................................ 1999-23545

(51) Int. Cl.⁷ .............................................. G06F 19/00
(52) U.S. Cl. ........................ 700/113; 700/112; 700/228
(58) Field of Search ........................ 700/112–116, 121, 700/108, 99, 100, 102, 95, 213, 214, 215, 228

(56) References Cited

U.S. PATENT DOCUMENTS

| | | | |
|---|---|---|---|
| 4,571,685 A | 2/1986 | Kamoshida | 364/468 |
| 4,672,185 A | 6/1987 | Sato et al. | 235/462 |
| 4,901,242 A | 2/1990 | Kotan | 364/468 |
| 5,111,404 A | 5/1992 | Kotani | 364/468 |
| 5,231,585 A | 7/1993 | Kobayashi et al. | 364/468 |
| 5,262,954 A | 11/1993 | Fujino et al. | 364/468 |
| 5,375,062 A | 12/1994 | Aoki | 364/468 |
| 5,402,349 A | 3/1995 | Fujita et al. | 364/468 |
| 5,440,493 A | 8/1995 | Doida | 364/468 |
| 5,495,417 A | 2/1996 | Fuduka et al. | 364/468 |
| 5,555,179 A | 9/1996 | Koyama et al. | 364/468 |
| 5,568,408 A | 10/1996 | Maeda | 364/580 |
| 5,579,231 A | 11/1996 | Sudou et al. | 364/468.01 |
| 5,596,712 A | 1/1997 | Tsuyama et al. | 395/183.02 |
| 5,668,056 A | 9/1997 | Wu et al. | 438/106 |
| 6,516,238 B1 * | 2/2003 | Kim et al. | 700/112 |

FOREIGN PATENT DOCUMENTS

GB      2233790 A     1/1991

* cited by examiner

*Primary Examiner*—Leo Picard
*Assistant Examiner*—Steven R. Garland
(74) *Attorney, Agent, or Firm*—Jacobson Holman PLLC

(57) ABSTRACT

A method for controlling an automatic guide vehicle (AGV) in a semiconductor factory automation (FA) system, includes the steps of: a) receiving operating mode information of a process equipment changed by an operator; b) storing the operating mode information of the process equipment changed in a real-time database; c) carrying out a predetermined semiconductor process at an operating mode having a full automation mode and sending a process completion signal after the predetermined semiconductor process has been completed, wherein the predetermined semiconductor process is applied to a lot of semiconductor wafers; d) creating a queue in response to the process completion signal; e) checking the operating mode information of the process equipment stored in the real-time database in response to the queue; f) inactivating the AGV by interrupting a transmission of the queue to the AGV if the operating mode information of the process equipment stored in the real-time database is not the full automation mode; and g) activating the AGV to unload the lot of semiconductor wafers from the process equipment in response to the queue if the operating mode information of the process equipment stored in the real-time database is the full automation mode. The method can effectively control the AGV by checking operating mode information stored in a real-time database in order to inactivate the AGV in a semiconductor FA system, when an operating mode is changed from a full automation mode to another mode by a system operator.

28 Claims, 4 Drawing Sheets

SEMICONDUCTOR FACTORY AUTOMATION SYSTEM AND METHOD FOR CONTROLLING AUTOMATIC GUIDE VEHICLE

FIELD OF THE INVENTION

The present invention relates to a semiconductor factory automation (FA) system; and, more particularly, to a semiconductor FA system and method. For controlling an automatic guide vehicle (AGV)

DESCRIPTION OF THE PRIOR ART

Referring to FIG. 1, there is shown a flowchart illustrating a method for controlling an automatic guide vehicle (AGV) in a conventional semiconductor FA system. As shown, the conventional semiconductor FA system includes a process equipment (EQ) 100, an server (EQS) 102, a cell management server (CMS) 104, an intrabay control server (ICS) 106, an AGV controller (AGVC) 108, an AGV 110, a stocker control server (SCS) 112 and a stocker 114. Further, the semiconductor FA system is employed in an operating mode. The operating mode includes a full automation mode, a semi-automation mode and a manual mode. Typically, the conventional semiconductor FA system is based on the full automation mode.

At step S118, when the EQ 100, i.e., a furnace equipment for carrying out a semiconductor manufacturing process, i.e., a diffusion process, has completed the diffusion process, the EQ 100 issues a process completion signal to the EQS 102.

At step S120, the EQS 102 sends a request message to the CMS 104 in response to the process completion signal, wherein the request message is defined as a message having a request for transporting a lot of semiconductor wafers from the EQ 100 to the stocker 114. A glossary of the lot is defined as a predetermined number of semiconductor wafers processed in a unit process, i.e. the diffusion process.

At step S122, the EQ 100 informs the EQS 102 that a semiconductor wafer cassette can be unloaded from the EQ 100, wherein the semiconductor wafer cassette is a container for containing the lot of semiconductor wafers transported from the EQ 100 to the stocker 114 by the AGV 110.

At step S124, the scheduler 116 receives the request message from the CMS 104 so that the scheduler 116 can schedule a following semiconductor process of the lot of semiconductor wafers in response to the request message.

At step S126, the EQS 102 sends an unloading queue to the CMS 104 in response to the process completion signal. The unloading queue includes a semiconductor wafer cassette identifier, an EQ identifier representing origination information of the semiconductor wafer cassette and a stocker identifier representing destination information of the semiconductor wafer cassette.

At step S128, the CMS 104 sends the unloading queue to the ICS 106.

At step S130, the EQS 102 sends a command to the EQ 100 so that the EQ 100 can put the lot of semiconductor wafers in the semiconductor wafer cassette in response to the command from the EQS 102.

At step S132, the ICS 106 sends the unloading queue to the AGVC 108.

At step S134, the AGVC 108 converts the unloading queue so that the unloading queue can be recognized in the AGVC 108, thereby creating an AGV control command to be sent to the AGV 110.

At step S135, the AGVC 108 sends the AGV control command to the AGV 110 by radio. At this time, the AGV 110 moves to the EQ 100 corresponding to the EQ identifier in order to unload the semiconductor wafer cassette from the EQ 100.

At step S136, if the AGV 110 has moved to the EQ 100 corresponding to the EQ identifier, the AGVC 108 sends movement completion message to the ICS 106.

At step S138, the ICS 106 sends the movement completion message to the CMS 104.

At step S140, the ICS 106 sends the movement completion message to the EQS 102.

At step S142, the EQS 102 sends an acknowledgment message to the ICS 106 in response to the movement completion message received from the ICS 106.

At step S144, the ICS 106 sends the acknowledgment message to the AGVC 108.

At step S146, the AGV 110 unloads the semiconductor wafer cassette from the EQ 100 corresponding to the EQ identifier.

At step S148, the AGV 110 loads the semiconductor wafer cassette to the stocker 114 corresponding to the stocker identifier.

At step S150, if the AGV 110 has loaded the semiconductor wafer cassette to the stocker 114 corresponding to the stocker identifier, the stocker 114 issues a loading completion signal to the SCS 112.

At step S152, the SCS 112 sends the loading completion message to the CMS 104 in response to the loading completion signal.

At step S154, the CMS 104 updates location information related to the semiconductor wafer cassette.

At step S156, the CMS 104 sends the loading completion message to the EQS 102.

At step S158, the EQS 102 flushes an EQ control file in response to the loading completion message.

After completing the semiconductor manufacturing process, i.e., the diffusion process carried out by a corresponding EQ 100, the conventional semiconductor FA system needs too much time in order to transport the semiconductor wafer cassette from the corresponding EQ 100 to a corresponding stocker 114. In order to reduce a time taken to transport the semiconductor wafer cassette from the corresponding EQ 100 to the corresponding stocker 114, the conventional semiconductor FA system strongly needs an operator's intervention.

Where the operating mode is changed from the full automation mode to the semi-automation mode or the manual mode at a point "A" shown in FIG. 1 by an operator, the operator can directly unload the semiconductor wafer cassette from the corresponding EQ 100. Then, the operator can directly load the semiconductor wafer cassette to the corresponding stocker 114. At this time, the AGVC 108 normally creates the AGV control command issued to the AGV 110 so as to unload the semiconductor wafer cassette from the corresponding EQ 100, thus moving the AGV 110 to the corresponding EQ 100. It is preferred that the AGV 110 is inactivated at the semi-automation or manual mode. However, there is a problem that the conventional semiconductor FA system can not inactivate the AGV at the semi-automation or manual mode.

SUMMARY OF THE INVENTION

It is, therefore, an object of the present invention to provide a semiconductor FA system and method for effectively controlling an automatic guide vehicle (AGV) by checking operating mode information stored in a real-time database in order to inactivate the AGV, when an operating mode is changed from a full automation mode to another mode by a system operator.

It is, therefore, another object of the present invention to provide a computer-readable media storing program instructions, the program instructions disposed on a computer to perform a method for effectively controlling an automatic guide vehicle (AGV) by checking operating mode information stored in a real-time database in order to inactivate the AGV in a semiconductor FA system, when an operating mode is changed from a full automation mode to another mode by a system operator.

In accordance with an aspect of the present invention, there is provided a semiconductor factory automation (FA) system, comprising: a common communication line; a plurality of semiconductor processing means coupled to said common communication each for carrying out a predetermined semiconductor process at an operating mode having a full automation mode and sending a process completion signal after the predetermined semiconductor process has been completed, wherein the predetermined semiconductor process is applied to a lot of semiconductor wafers; an operator interface means coupled to said common communication line for receiving operating mode information of each semiconductor processing means and the operating mode information changed by an operator; a storing means coupled to said common communication line for storing the operating mode information changed from said operator interface means; a creation means coupled to said common communication line for creating a queue in response to the process completion signal; a control means coupled to said common communication line and responsive to the queue for checking the operating mode information of each semiconductor processing means stored in said storing means; and a transportation means for unloading the lot of semiconductor wafers from each semiconductor processing means in response to the queue received from said control means, wherein said control means inactivates said transportation means by interrupting a transmission of the queue to said transportation means if the operating mode information of each semiconductor processing means stored in said storing means is not the full automation mode.

In accordance with another aspect of the present invention, there is provided a method for controlling an automatic guide vehicle (AGV) in a semiconductor factory automation (FA) system, comprising the steps of: a) receiving operating mode information of a process equipment changed by an operator; b) storing the operating mode information of the process equipment changed in a real-time database; c) carrying out a predetermined semiconductor process at an operating mode having a full automation mode and sending a process completion signal after the predetermined semiconductor process has been completed, wherein the predetermined semiconductor process is applied to a lot of semiconductor wafers; d) creating a queue in response to the process completion signal; e) checking the operating mode information of the process equipment stored in the real-time database in response to the queue; f) inactivating the AGV by interrupting a transmission of the queue to the AGV if the operating mode information of the process equipment stored in the real-time database is not the full automation mode; and g) activating the AGV to unload the lot of semiconductor wafers from the process equipment in response to the queue if the operating mode information of the process equipment stored in the real-time database is the full automation mode.

In accordance with further another aspect of the present invention, there is provided a computer-readable media storing program instructions, the program instructions disposed on a computer to perform a method for controlling an automatic guide vehicle (AGV) in a semiconductor factory automation (FA) system, comprising the steps of: a) receiving operating mode information of a process equipment changed by an operator; b) storing the operating mode information of the process equipment changed in a real-time database; c) carrying out a predetermined semiconductor process at an operating mode having a full automation mode and sending a process completion signal after the predetermined semiconductor process has been completed, wherein the predetermined semiconductor process is applied to a lot of semiconductor wafers; d) creating a queue in response to the process completion signal; e) checking the operating mode information of the process equipment stored in the real-time database in response to the queue; f) inactivating the AGV by interrupting a transmission of the queue to the AGV if the operating mode information of the process equipment stored in the real-time database is not the full automation mode; and g) activating the AGV to unload the lot of semiconductor wafers from the process equipment in response to the queue if the operating mode information of the process equipment stored in the real-time database is the full automation mode.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
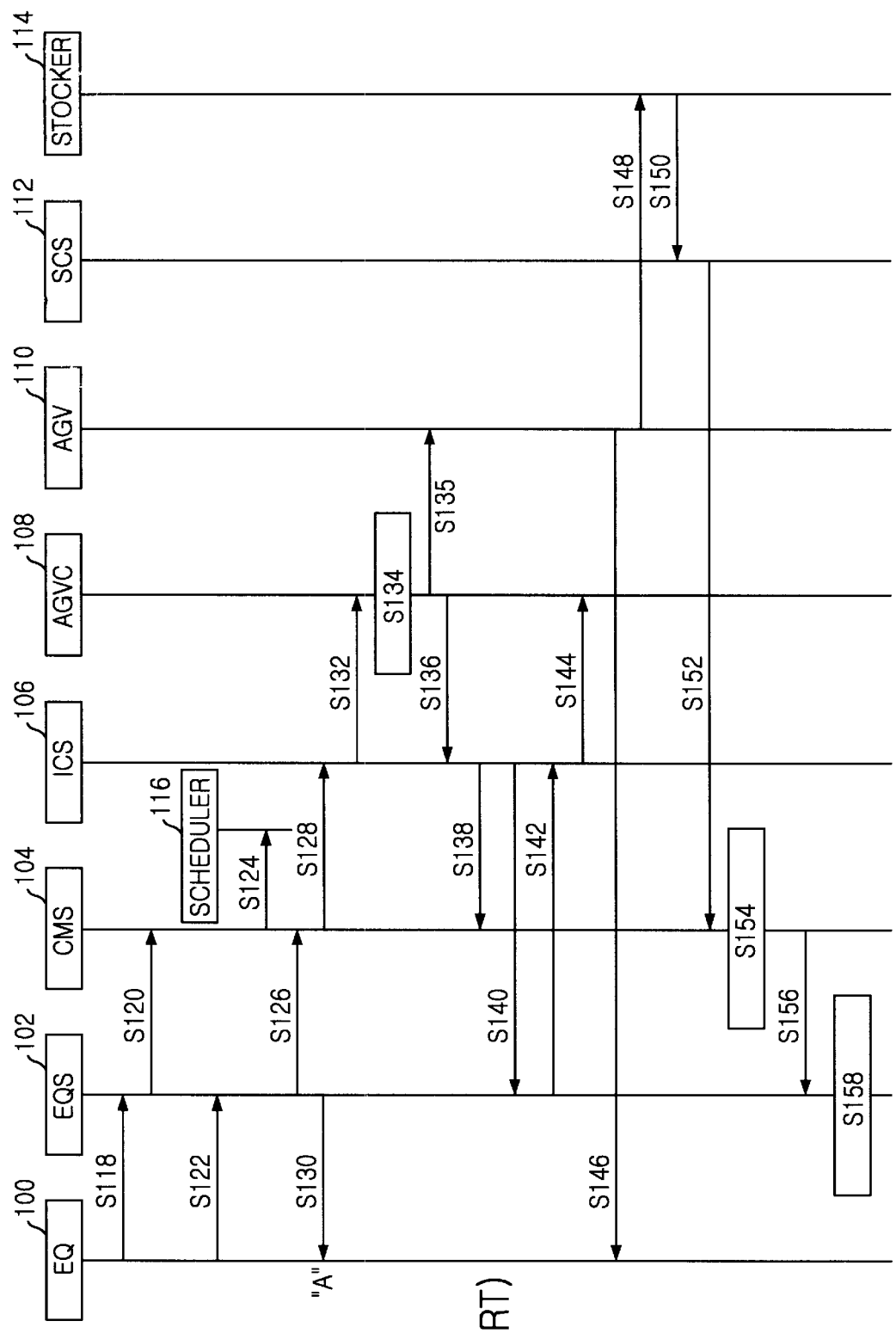
FIG. 1 is a flowchart illustrating a method for controlling an automatic guide vehicle (AGV) in a conventional semiconductor factory automation (FA) system.
Figure 2:
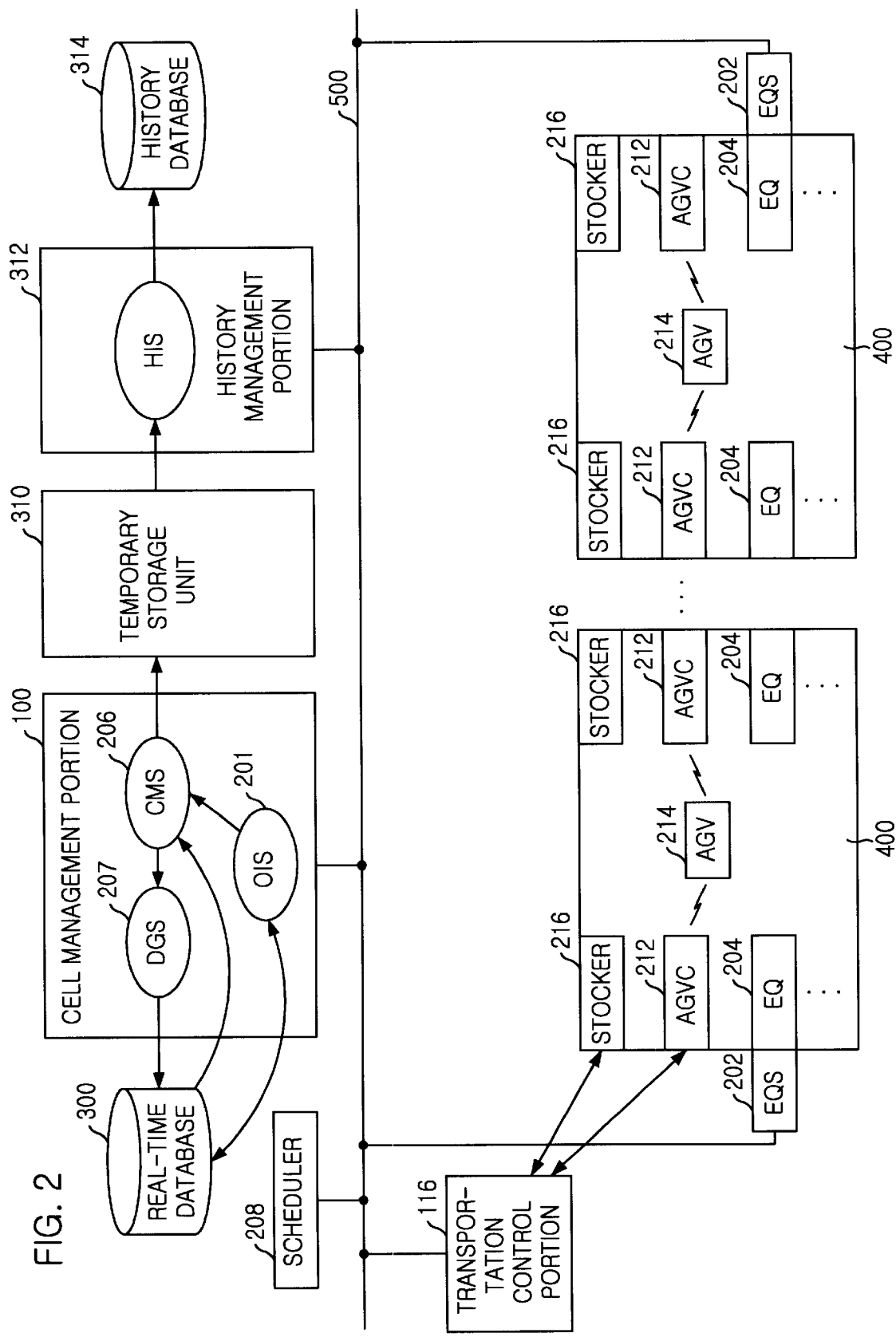
FIG. 2 is a block diagram-describing a semiconductor FA system for controlling an AGV in accordance with the present invention.

Referring to FIG. 2, there is shown a block diagram showing a semiconductor factory automation (FA) system in accordance with the present invention. As shown, the semiconductor FA system includes at least one cell, which has a predetermined number, e.g., 4, of semiconductor production bays. A semiconductor production bay 400 is included in a cell. A semiconductor production bay 400 is provided with process equipments (EQs) 204, stockers 216 and an automatic guide vehicle (AGV) 214. The EQ 204 processes semiconductor wafers in order to obtain semiconductor devices. The EQ 204 includes, e.g., an etching equipment, a photo-lithography equipment, a furnace equipment and the like. A stocker 216 temporarily stores a number of semiconductor wafer cassettes. Each of semiconductor wafer cassettes has a predetermined number of semiconductor wafers, which is referred to as a lot. The semiconductor wafer cassettes are selectively transported to the EQ 204 by using the AGV 214. The semiconductor wafer cassette stored in the stocker 216 is transported to another semiconductor production bay 400.

A process equipment server (EQS) 202 is coupled to a common communication line 500, e.g., Ethernet™ supplied by Xerox Corporation. An AGV controller (AGVC) 212 controls the AGV 214.

The semiconductor FA system also includes a cell management portion 100, a real-time database 300 connected to the cell management portion 100, a temporary storage unit 310, a history management portion 312 connected to the temporary storage unit 310 and a history database 314 connected to the history management portion 312. The cell management portion 100, the history management portion 312 and the history database 314 are respectively connected to the common communication line 500 for communication therebetween.

The cell management portion 100 includes a cell management server (CMS) 206, an operator interface server (OIS) 201 and a data gathering server (DGS) 207. The DGS 207 stores process data associated with the lot in the real-time database 300.

Figure 3:
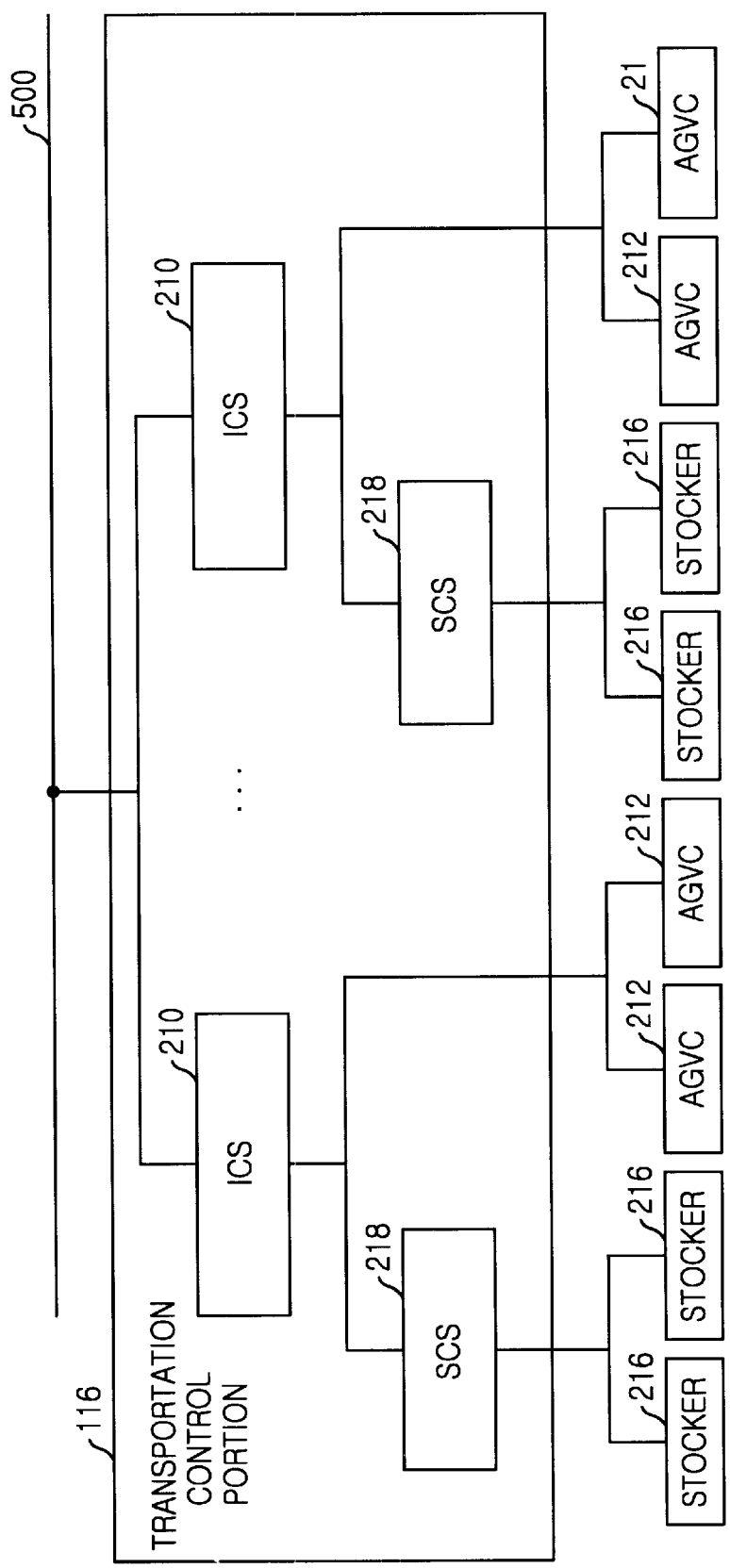
FIG. 3 is a block diagram a block diagram illustrating a transportation control portion shown in FIG. 2.

Referring to FIG. 3, there is shown a block diagram illustrating a transportation control portion shown in FIG. 2. As shown, the transportation control portion 116 includes intrabay control servers (ICSs) 210 coupled to the common communication line 500 and stocker control servers (SCSs) 218. The ICS 210 converts a transportation message into a transportation command from the common communication line 500. The SCS 218 generates a stocker control command to control the stockers 216 in response to the transportation command. The AGVC 212 generates an AGV control command to control an AGV 214 in response to the transportation command.

Referring to FIGS. 2 and 3, the semiconductor FA system is based on a full-automation mode. An operator can change an operating mode of an EQ 204 from the full automation mode to a semi-automation or manual mode through the OIS 201 coupled to the common communication line 500.

The real-time database 300 coupled to the common communication line 500 stores information related to the changed operating mode of the EQ 204, i.e., the semi-automation or manual mode.

The EQ 204, i.e., a furnace equipment, coupled to the common communication line 500 carries out a semiconductor manufacturing process, i.e., a diffusion process. If the EQ 204 has completed the diffusion process, the EQ 204 issues a process completion signal to the EQS 202. After issuing the process completion signal, the EQ 204 informs the CMS 206 that a semiconductor wafer cassette can be unloaded from the EQ 204. The semiconductor wafer cassette is a container for containing the lot of semiconductor wafers transported from the EQ 204 to a stocker 216 by an AGV 214.

The EQS 202 coupled to the common communication line 500 sends a request message to the CMS 206 in response to the process completion signal from the EQ 204. The request message is defined as a message having a request for moving a lot of semiconductor wafers from the EQ 204 to the stocker 216.

After the EQ 204 informs the EQS 202 that the semiconductor wafer cassette can be unloaded from the EQ 204, the EQS 202 creates an unloading queue and sends the unloading queue to the CMS 206. The unloading queue includes a semiconductor wafer cassette identifier, an EQ identifier representing origination information of the semiconductor wafer cassette and a stocker identifier representing destination information of the semiconductor wafer cassette.

The EQS 202 sends a command to the EQ 204 so that the EQ 204 can put the lot of semiconductor wafers in the semiconductor wafer cassette in response to the command from the EQS 202. After sending the command to the EQ 204, the EQS 202 sends an acknowledgment message to the ICS 210 in response to a movement completion message from the ICS 210. After the semiconductor wafer cassette has been loaded to the stocker 216, the EQS 202 flushes an EQ control file and updates location information related to the semiconductor wafer cassette.

The CMS 206 coupled to common communication line 500 sends the request message from the EQS 202 to the scheduler 208. After sending the request message from the EQS 202 to the scheduler 208, the CMS 206 sends the unloading queue from the EQS 202 to the ICS 210. After the stocker 216 has loaded the semiconductor wafer cassette, the CMS 206, sends a loading completion message from the stocker 216 to the EQS 202.

The scheduler 208 coupled to the common communication line 500 receives the request message from the CMS 206 so that the scheduler 208 can schedule a following process of the lot of semiconductor wafers in response to the request message from the CMS 206.

The ICS 210 coupled to the common communication line 500 checks operating mode information of the EQ 204 stored in the real-time database 300 to check whether the operating mode information of the EQ 204 is the full automation mode. If the operating mode information of the EQ 204 stored in the real-time database 300 is the semi-automation or manual mode, the ICS 210 interrupts a transmission of the unloading queue from the CMS 206 to an AGVC 212, thereby inactivating the AGV 214. Then, the operator unloads the semiconductor wafer cassette corresponding to the semiconductor wafer cassette identifier from the EQ 204 corresponding to the EQ identifier. After unloading the semiconductor wafer cassette, the operator loads the semiconductor wafer cassette to the stocker 216 corresponding to the stocker identifier.

On the other hands, if the operating mode information of the EQ 204 stored in the real-time database 300 is the full automation mode, the ICS 210 sends the unloading queue to the AGVC 212.

Further, the ICS 210 sends the movement completion message to the CMS 206 and the EQS 202. The ICS 210 sends the acknowledgment message from the EQS 202 to the AGVC 212.

The AGVC 212 coupled to the common communication line 500 converts the unloading queue so that the unloading queue can be recognized in the AGVC 212, thereby creating an AGV control command to be sent to the AGV 214. The AGVC 212 sends the AGV control command to the AGV 214 by radio, thereby activating the AGV 214. Then, in response to the AGV control command, the AGV 214 moves to the EQ 204 corresponding to the EQ identifier in order to unload the semiconductor wafer cassette from the EQ 204. If the AGV 214 has moved to the EQ 204 corresponding to the EQ identifier, the AGVC 212 sends the movement completion signal to the ICS 210.

The AGV 214 unloads the semiconductor wafer cassette from the EQ 204 corresponding to the EQ identifier. The AGV 214 loads the semiconductor wafer cassette to the stocker 216 corresponding to the stocker identifier.

If the AGV 214 has loaded the semiconductor wafer cassette to the stocker 216 corresponding to the stocker identifier, the stocker 216 issues the loading completion message to the SCS 218.

The SCS 218 coupled to the common communication line 500 sends the loading completion message from the stocker 216 to the CMS 206.

Figure 4:
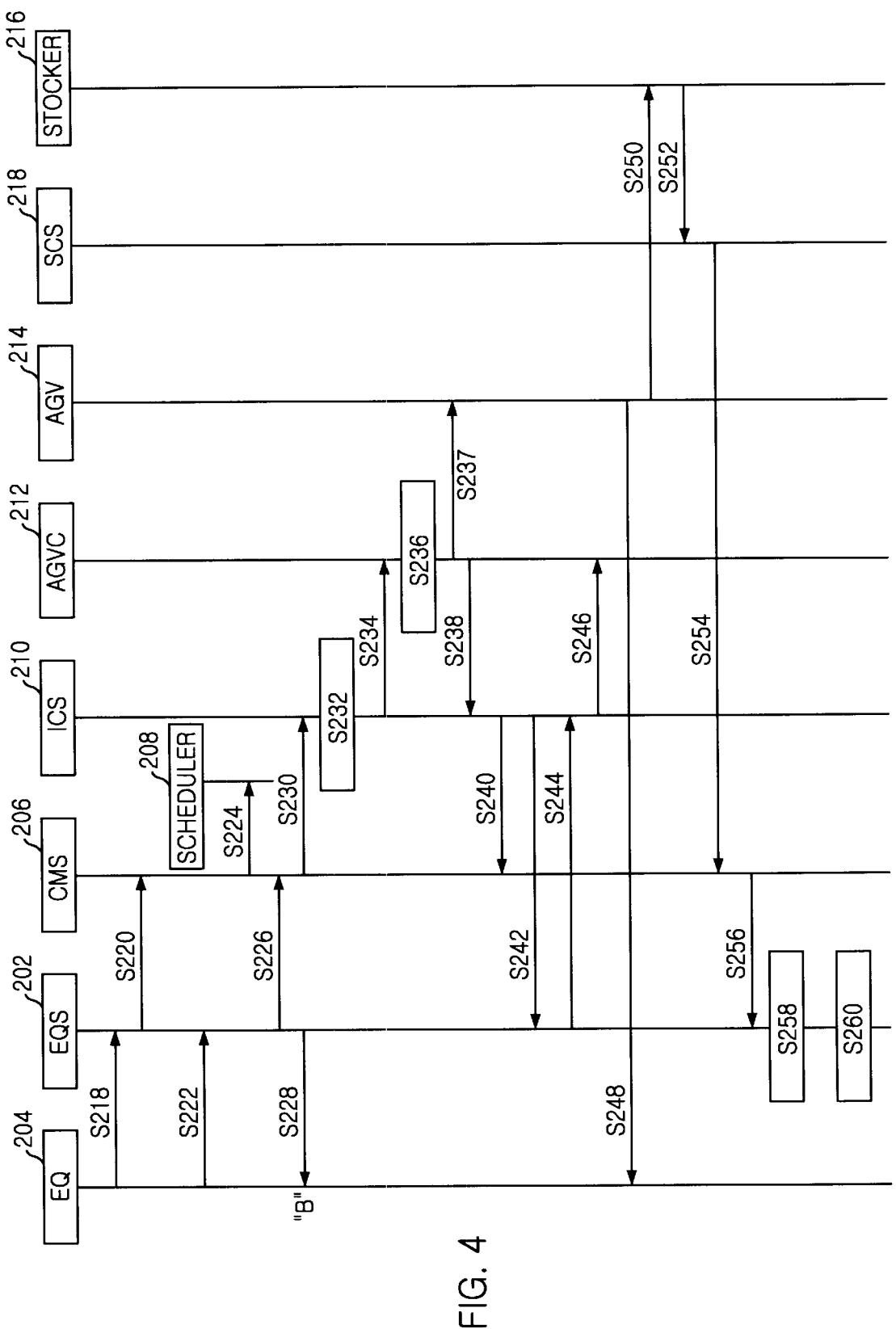
FIG. 4 is a flowchart showing a method for controlling an AGV in a semiconductor FA system in accordance with the present invention.

Referring to FIG. 4, there is shown a flowchart showing a method for controlling an AGV in a semiconductor FA system in accordance with the present invention.

At step S218, when an EQ 204, i.e., furnace equipment for carrying out a semiconductor manufacturing process,. i.e., a diffusion process, has completed the diffusion process, the EQ 204 issues a process completion signal to an EQS 202.

At step S220, the EQS 202 sends a request message to a CMS 206 in response to the process completion signal, wherein the request message is defined as a message having a request for transporting a lot of semiconductor wafers from the EQ 204 to a stocker 216.

At step S222, the EQ 204 informs the EQS 202 that a semiconductor wafer cassette can be unloaded from the EQ 204, wherein the semiconductor wafer cassette is a container for containing the lot of semiconductor wafers carried from the EQ 204 to the stocker 216 by an AGV 214.

At step S224, a scheduler 208 receives the request message from the CMS 206 so that the scheduler 208 can schedule a following semiconductor process of the lot of semiconductor wafers in response to the request message.

At step S226, the EQS 202 creates an unloading queue and sends the unloading queue to the CMS 206. The unloading queue includes a semiconductor wafer cassette identifier, an EQ identifier indicating an origination of the semiconductor wafer cassette unloaded and a stocker identifier indicating a destination of the semiconductor wafer cassette unloaded.

At step S228, the EQS 202 sends a command to the EQ 204 so that the EQ 204 can put the lot of semiconductor wafers in the semiconductor wafer cassette in response to the command from the EQS 202. At a point "B", an operator changes an operating mode of the EQ 204 from a full automation mode to a semi-automation or manual mode through an OIS 201 as shown in FIG. 2. Then, a real-time database 300 as in FIG. 2 stores changed operating mode information of the EQ 204, i.e., the semi-automation or manual mode. The operator can change the operating mode from the full automation mode to the semi-automation or manual mode at another point.

At step S230, the CMS 206 sends the unloading queue to an ICS 210.

At step S232, the ICS 210 checks the operating mode information of the EQ 204 stored in the real-time database 300 to check whether the operating mode of the EQ 204 is the full automation mode.

If the operating mode information of the EQ 204 stored in the real-time database 300 is the semi-automation or manual mode, the ICS 210 interrupts a transmission of the unloading queue from the CMS 206 to an AGVC 212, thereby inactivating the AGV 214. Then, the operator unloads the semiconductor wafer cassette corresponding to the semiconductor wafer cassette identifier from the EQ 204 corresponding to the EQ identifier. After unloading the semiconductor wafer cassette, the operator loads the semiconductor wafer cassette to the stocker 216 corresponding to the stocker identifier.

At step S234, if the operating mode of the EQ 204 stored in the real-time database 300 is the full automation mode, the ICS 210 sends the unloading queue to the AGVC 212.

At step S236, the AGVC 212 converts the unloading queue so that the unloading queue can be recognized in the AGVC 212, thereby creating an AGV control command to be sent to the AGV 214.

At step S237, the AGVC 212 sends the AGV control command to the AGV 214 by radio, thereby activating the AGV 214. Then, in response to the AGV control command, the AGV 214 moves to the EQ 204 corresponding to the EQ identifier in order to unload the semiconductor wafer cassette from the EQ 204.

At step S238, if the AGV214 has moved to the EQ 204 corresponding to the EQ identifier, the AGVC 212 sends a movement completion message to the ICS 210.

At step S240, the ICS 210 sends the movement completion message to the CMS 206.

At step S242, the ICS 210 sends the movement completion message to the EQS 202.

At step S244, the EQS 202 sends an acknowledgment message to the ICS 210 in response to the movement completion message received from the ICS 210.

At step S246, the ICS 210 sends the acknowledgment message to the AGVC 212.

At step S248, the AGV.214 unloads the semiconductor wafer cassette from the EQ 100 corresponding to the EQ identifier.

At step S250, the AGV 214 loads the semiconductor wafer cassette to the stocker 216 corresponding to the stocker identifier.

At step S252, if the AGV 214 has loaded the semiconductor wafer cassette to the stocker 216 corresponding to the stocker identifier, the stocker 216 issues a loading completion signal to an SCS 218.

At step S254, the SCS 218 sends the loading completion message to the CMS 206 in response to the loading completion signal.

At step S256, the CMS 206 sends the loading completion message to the EQS 202.

At step S258, the EQS 202 flushes an EQ control file in response to the loading completion message.

At step S260, the EQS 202 updates location information related to the semiconductor wafer cassette.

As described above, the method in accordance with the present invention effectively controls the AGV 214 by interrupting the transmission of the unloading queue to the AGVC 212 if the operator changes the operating mode from the full automation mode to the semi-automation or manual mode. A computer-readable media such as an optical disk or a hard disk can store program instructions disposed on a computer to perform the method for controlling the AGV in the FA system in accordance with the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A semiconductor factory automation (FA) system, comprising:

a common communication line;

a plurality of semiconductor processing means coupled to said common communication each for carrying out a predetermined semiconductor process at an operating mode having a full automation mode and sending a process completion signal after the predetermined semiconductor process has been completed, wherein the predetermined semiconductor process is applied to a lot of semiconductor wafers;

an operator interface means coupled to said common communication line for receiving operating mode information of each semiconductor processing means and the operating mode information changed by an operator;

a storing means coupled to said common communication line for storing the operating mode information changed from said operator interface means;

a creation means coupled to said common communication line for creating a queue in response to the process completion signal;

a control means coupled to said common communication line and responsive to the queue for checking the operating mode information of each semiconductor processing means stored in said storing means; and a transportation means for unloading the lot of semiconductor wafers from each semiconductor processing means in response to the queue received from said control means, wherein said control means inactivates said transportation means by interrupting a transmission of the queue to said transportation means if the operating mode information of each semiconductor processing means stored in said storing means is not the full automation mode.

2. The semiconductor FA system as recited in claim 1, wherein the lot of semiconductor wafers is unloaded from each semiconductor processing means by the operator if said control means inactivates said transportation means by interrupting a transmission of the queue to said transportation means.

3. The semiconductor FA system as recited in claim 1, wherein said plurality of semiconductor processing means includes a plurality of process equipments.

4. The semiconductor FA system as recited in claim 3, wherein said creation means further sends a request message as a message having a request for transporting the lot of semiconductor wafers in response to the process completion signal.

5. The semiconductor FA system as recited in claim 4, further comprising:

a scheduling means coupled to said common communication line for scheduling a following semiconductor process of the lot of semiconductor wafers in response to the request message.

6. The semiconductor FA system as recited in claim 4, wherein one of the process equipments includes a semiconductor wafer cassette as a container containing the lot of semiconductor wafers.

7. The semiconductor FA system as recited in claim 6, wherein the process equipment further informs said creation means that the semiconductor wafer cassette can be unloaded from the process equipment, after sending the process completion signal to said creation means.

8. The semiconductor FA system as recited in claim 7, wherein the queue includes a semiconductor wafer cassette identifier, a process equipment identifier representing origination information of the semiconductor wafer cassette and a stocker identifier representing destination information of the semiconductor wafer cassette.

9. The semiconductor FA system as recited in claim 8, further comprising:

a transportation control means for generating an transportation control command by converting the queue to send the transportation control command to said transportation means, wherein said transportation means moves to the process equipment corresponding to the process equipment identifier in response to the transportation control command; and a stocker for loading the semiconductor wafer cassette and generating a loading completion message after said transportation means has loaded the semiconductor wafer cassette to said stocker corresponding to the stocker identifier.

10. The semiconductor FA system as recited in claim 9, wherein said creation means further flushes a process equipment control file and updates location information related to the semiconductor wafer cassette in response to the loading completion message.

11. The semiconductor FA system as recited in claim 4, wherein the process equipment includes a furnace equipment.

12. The semiconductor FA system as recited in claim 1, wherein the predetermined semiconductor process includes a diffusion process.

13. The semiconductor FA system as recited in claim 1, wherein said storing means includes a real-time database.

14. The semiconductor FA system as recited in claim 1, wherein said common communication line includes an Ethernet™ cable supplied by Xerox Corporation.

15. The semiconductor FA system as recited in claim 1, wherein the operating mode includes the full automation mode, a semi-automation mode and a manual mode.

16. A method for controlling an automatic guide vehicle (AGV) in a semiconductor factory automation (FA) system, comprising the steps of:

a) receiving operating mode information of a process equipment changed by an operator;

b) storing the operating mode information of the process equipment changed in a real-time database;

c) carrying out a predetermined semiconductor process at an operating mode having a full automation mode and sending a process completion signal after the predetermined semiconductor process has been completed, wherein the predetermined semiconductor process is applied to a lot of semiconductor wafers;

d) creating a queue in response to the process completion signal;

e) checking the operating mode information of the process equipment stored in the real-time database in response to the queue;

f) inactivating the AGV by interrupting a transmission of the queue to the AGV if the operating mode information of the process equipment stored in the real-time database is not the full automation mode; and g) activating the AGV to unload the lot of semiconductor wafers from the process equipment in response to the queue if the operating mode information of the process equipment stored in the real-time database is the full automation mode.

17. The method as recited in claim 16, wherein the lot of semiconductor wafers contained in said step c) is unloaded from the process equipment by the operator if the operating mode information of the process equipment stored in the real-time database is not the full automation mode.

18. The method as recited in claim 16, wherein said step d) includes the steps of:

d1) sending a request message as a message having a request for transporting the lot of semiconductor wafers from a process equipment server to a cell management server in response to the process completion signal;

d2) informing the process equipment server that the semiconductor wafer cassette can be unloaded from the process equipment;

d3) scheduling a following semiconductor process of the lot of semiconductor wafers in response to the request message; and d4) creating the queue in response to the process completion signal.

19. The method as recited in claim 16, wherein the process equipment contained in said step a) includes a semiconductor wafer cassette as a container containing the lot of semiconductor wafers.

20. The method as recited in claim 16, wherein the queue contained in said step d) includes a semiconductor wafer cassette identifier, a process equipment identifier representing origination information of a semiconductor wafer cassette and a stocker identifier representing destination information of the semiconductor wafer cassette.

21. The method as recited in claim 20, wherein said step g) includes the steps of:

g1) generating an AGV control command by converting the queue to send the AGV control command from an AGVC to the AGV;

g2) moving the AGV to the process equipment corresponding to the process equipment identifier in response to the AGV control command; and g3) if the operating mode information of the process equipment stored in the real-time database is the full automation mode, activating the AGV to unload the lot of semiconductor wafers from the process equipment in response to the queue.

22. The method as recited in claim 21, wherein said step g3) further includes the steps of:

g3-a) loading the semiconductor wafer cassette to a stocker corresponding to the stocker identifier; and g3-b) generating a loading completion message in the stocker.

23. The method as recited in claim 22, wherein said step g3-b) further includes the steps of:

g3-b1) flushing a process equipment control file in response to the loading completion message; and g3-b2) updating location information related to the semiconductor wafer cassette.

24. The method as recited in claim 16, wherein the process equipment contained in said step a) includes a furnace equipment.

25. The method as recited in claim 16, wherein the predetermined semiconductor process contained in said step c) includes a diffusion process.

26. The method as recited in claim 16, wherein the operating mode contained in said step c) includes the full automation mode, a semi-automation mode and a manual mode.

27. A computer-readable media storing program instructions, the program instructions disposed on a computer to perform a method for controlling an automatic guide vehicle (AGV) in a semiconductor factory automation (FA) system, comprising the steps of:

a) receiving operating mode information of a process equipment changed by an operator;

b) storing the operating mode information of the process equipment changed in a real-time database;

c) carrying out a predetermined semiconductor process at an operating mode having a full automation mode and sending a process completion signal after the predetermined semiconductor process has been completed, wherein the predetermined semiconductor process is applied to a lot of semiconductor wafers;

d) creating a queue in response to the process completion signal;

e) checking the operating mode information of the process equipment stored in the real-time database in response to the queue;

f) inactivating the AGV by interrupting a transmission of the queue to the AGV if the operating mode information of the process equipment stored in the real-time database is not the full automation mode; and g) activating the AGV to unload the lot of semiconductor wafers from the process equipment in response to the queue if the operating mode information of the process equipment stored in the real-time database is the full automation mode.

28. The computer-readable media as recited in claim 27, wherein the lot of semiconductor wafers contained in said step c) is unloaded from the process equipment by the operator if the operating mode information of the process equipment stored in the real-time database is not the full automation mode.

* * * * *